United States Patent
Yu et al.

(10) Patent No.: US 8,374,295 B2
(45) Date of Patent: Feb. 12, 2013

(54) METHOD OF SCALING INPUT DATA AND MOBILE DEVICE UTILIZING THE SAME

(75) Inventors: Chi-Yeh Yu, Hsinchu (TW); Shih-Kung Chang, Chiayi (TW); Chun-Ming Kuo, Taipei County (TW); I-Ping Chang, Tainan (TW); Ho-Chi Huang, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 1087 days.

(21) Appl. No.: 11/778,215

(22) Filed: Jul. 16, 2007

(65) Prior Publication Data

US 2008/0069269 A1 Mar. 20, 2008

Related U.S. Application Data

(60) Provisional application No. 60/825,951, filed on Sep. 18, 2006.

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........................ 375/346; 375/316
(58) Field of Classification Search ................... 375/346
See application file for complete search history.

(56) References Cited

U.S. PATENT DOCUMENTS

| | | | | |
|---|---|---|---|---|
| 6,404,826 | B1 * | 6/2002 | Schmidl et al. | 375/340 |
| 6,563,615 | B2 | 5/2003 | Milton et al. | |
| 6,986,096 | B2 | 1/2006 | Chaudhuri et al. | |
| 7,200,194 | B2 | 4/2007 | Lin et al. | |
| 2001/0053142 | A1 * | 12/2001 | Abe et al. | 370/337 |
| 2002/0154620 | A1 * | 10/2002 | Azenkot et al. | 370/347 |
| 2004/0001554 | A1 * | 1/2004 | Sun et al. | 375/260 |
| 2004/0078196 | A1 | 4/2004 | Abe et al. | |
| 2004/0258144 | A1 * | 12/2004 | Omori | 375/224 |
| 2005/0025076 | A1 * | 2/2005 | Chaudhuri et al. | 370/310 |
| 2005/0111584 | A1 | 5/2005 | Kruger | |
| 2006/0056496 | A1 | 3/2006 | Smee et al. | |
| 2008/0022183 | A1 * | 1/2008 | Arslan et al. | 714/758 |
| 2009/0044230 | A1 * | 2/2009 | Oh et al. | 725/62 |
| 2009/0213903 | A1 * | 8/2009 | Wu et al. | 375/140 |
| 2010/0191525 | A1 * | 7/2010 | Rabenko et al. | 704/211 |

FOREIGN PATENT DOCUMENTS

| | | |
|---|---|---|
| WO | WO03085917 | 10/2003 |
| WO | WO2005013543 | 2/2005 |

* cited by examiner

*Primary Examiner* — Erin File
(74) *Attorney, Agent, or Firm* — McClure, Qualey & Rodack, LLP

(57) ABSTRACT

A mobile device capable of scaling input data and a method thereof. The mobile device comprises a data segmentation module, a quality measure module, and a scaling module. The data segmentation module divides the input data into a plurality of subdata. The quality measure module, coupled to the data segmentation module, calculates signal quality of each subdata. The scaling module, coupled to the quality measure module, scales each subdata according to corresponding signal quality.

21 Claims, 7 Drawing Sheets

METHOD OF SCALING INPUT DATA AND MOBILE DEVICE UTILIZING THE SAME

CROSS REFERENCE

This application claims the benefit of U.S. provisional application Ser. No. 60/825,951 filed Sep. 18, 2006, the subject matter of which is incorporated herein by reference.

BACKGROUND OF THE INVENTION

1. Field of the Invention

The invention relates to telecommunication, and in particular to a method of scaling input data and a mobile device in a telecommunication system.

2. Description of the Related Art

In wireless communication, a transmitter such as a base station encodes and modulates transmitted data to transmit to a receiver through a transmission channel. The transmission typically is not continuous but manifests as "data bursts", with one burst for each transmitted data block. The transmission channel, such as a radio frequency (RF) channel, distorts each data burst with a particular channel response, and further degrades each data burst with noise and interference. The receiver, such as a mobile phone, receives the data bursts, and processes every set of soft-decision bits therein to obtain a quantization output, referred to as soft-decision decoding.

Soft-decision decoding is beneficial in a receiver to provide higher receiver gain than would be possible with hard-decision, thereby combating common channel fading, interference and noise problems in the transmission channel. The receiver gain increases with soft-decision bits. Soft-decision decoding scales and quantizes each data burst with one or a few bits of precision to provide more than two states or levels. If data bursts are quantized to one-bit precision ($<0V=1$, $\geq 0V=0$), the result is hard-decision data. If data bursts are quantized with more than one bit of precision, the result is soft-decision data, e.g., quantizing data bursts with three-bit precision results in 8 possible levels of quantization output. Before quantization each data burst is typically scaled by a single scale factor to provide proper amplitude for the quantization. Conventional scale factoring is based on a signal-to-noise-and-interference ratio (SINR) of the data burst.

However asynchronous communication systems such as Global System for Mobile communication (GSM) systems contain typically higher co-channel and adjacent channel interference. Further, since data is transmitted in bursts and not continuous, channel conditions of the transmission channel vary with time, resulting in changing interference and noise quantity, and varying SINR for each data burst.

Thus a need exists for a mobile device and a method of scaling data burst transmitted asynchronously through a channel under varying channel conditions.

BRIEF SUMMARY OF THE INVENTION

A detailed description is given in the following embodiments with reference to the accompanying drawings.

According to the invention, a method of processing input data in a receiver is disclosed, comprising dividing the input data into a plurality of subdata, calculating signal quality of each subdata, and scaling each subdata according to corresponding signal quality.

According to another embodiment of the invention, a mobile device capable of scaling input data comprises a data segmentation module, a quality measure module, and a scaling module. The data segmentation module divides the input data into a plurality of subdata. The quality measure module, coupled to the data segmentation module, calculates signal quality of each subdata. The scaling module, coupled to the quality measure module, scales each subdata according to corresponding signal quality According to yet another embodiment of the invention, a receiver capable of scaling input data comprises a data segmentation module, a quality measure module, and a scaling module. The data segmentation module divides the input data into a plurality of subdata. The quality measure module, coupled to the data segmentation module, calculates signal quality of each subdata. The scaling module, coupled to the quality measure module, scales each subdata according to corresponding signal quality.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Scope of the invention may include, but is not limited to, a Time Division Multiple Access (TDMA) system, a Code Division Multiple Access (CDMA) system, Frequency Division Multiple Access (FDMA) system, CDMA-2000 and wide band CDMA (WCDMA) systems, Global System for Mobile communication (GSM) system, third generation cellular systems (3G) system, Orthogonal Frequency Division Multiplexing (OFDM) based system, and the like.

Figure 1:
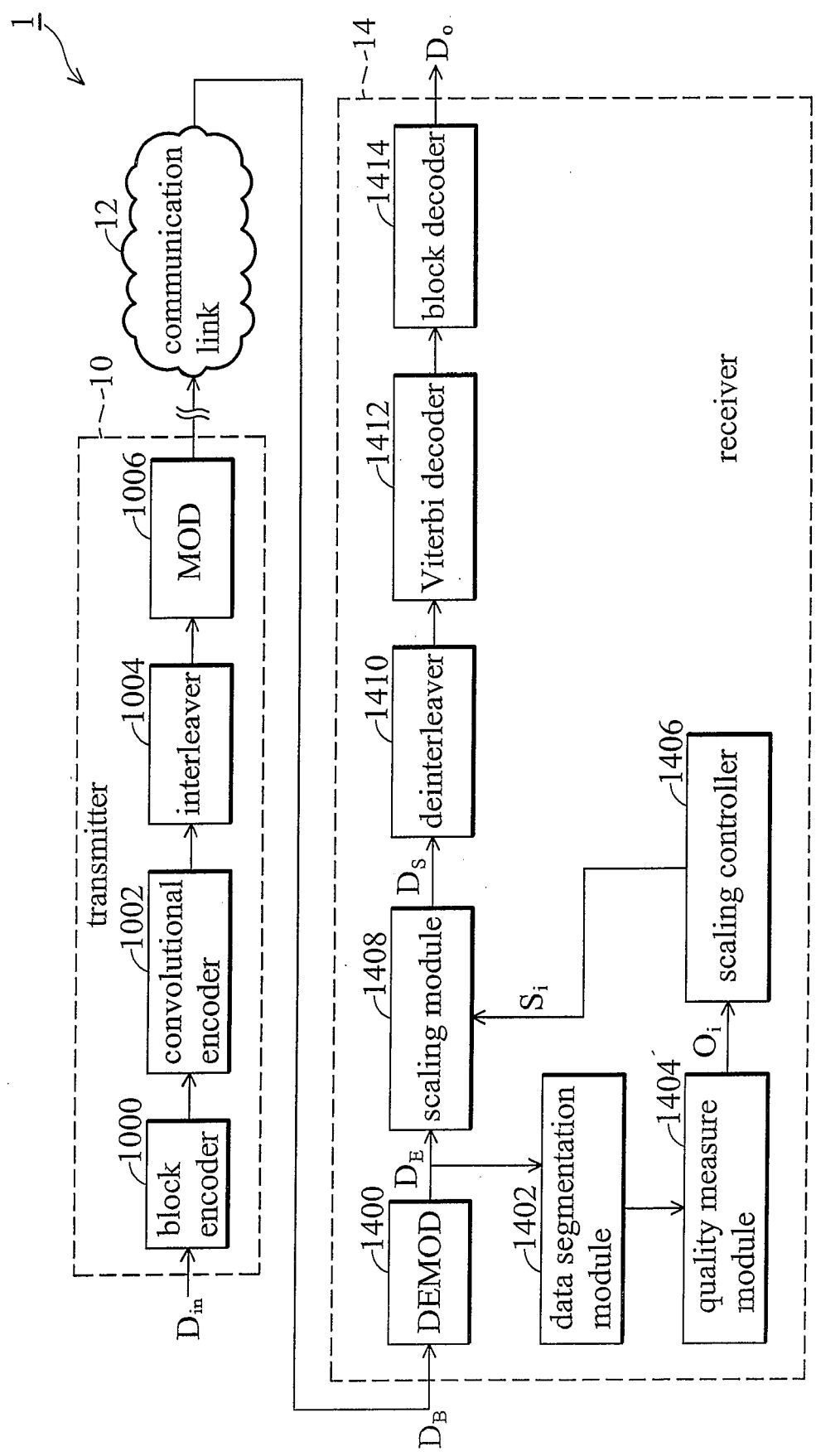
FIG. 1 is a block diagram of an exemplary convolution code communication system according to the invention.

FIG. 1 is a block diagram of an exemplary convolution code communication system according to the invention, comprising transmitter 10, communication link 12, and receiver 14. Transmitter 10 is coupled to communication link 12, and then to receiver 14.

Transmitter 10 may be a base station transmitting burst data $D_B$ through communication link 12 to receiver 14. Transmitter 10 comprises block encoder 1000, convolutional encoder 1002, interleaver 1004, and modulator 1006. Block encoder 1000 is coupled to convolutional encoder 1002, interleaver 1004, and subsequently to modulator 1006. Block encoder 1000 performs block encoding on input data $D_{in}$ to produce parity bits for error detection. Convolutional encoder 1002 performs convolutional encoding on the block encoded input data $D_{in}$ to generate convolutional code for error detection and correction. Interleaver 1004 rearranges order of the convolutional code using a set of registers to generate interleaved $D_{in}$. Interleaved input data $D_{in}$ are grouped into a predetermined number of block data $D_B$, wherein the predetermined number may be 4, 8, or 22 depending on the channel type such as voice, circuit switched, paging, or control channel. Modulator 1006 modules block data $D_B$ according to a modulation scheme such as GMSK or EPSK to generate downlink signal $S_D$ appropriate for wireless transmission. Burst data $D_B$ comprises complex symbols with in-phase (I) and quadrature (Q) components.

Communication link 12 comprises wireless transmission media comprising interference or noise that is either constant or changing with time.

Receiver 14 may be a mobile station receiving downlink signal $S_D$. Receiver 14 comprises demodulator 1400, data segmentation module 1402, quality measure module 1404, scaling controller 1406, scaling module 1408, deinterleaver 1410, Viterbi decoder 1412, and block decoder 1414. Demodulator 1400 is coupled to scaling module 1408 and data segmentation module 1402, in turn coupled to quality measure module 1404, scaling controller 1406, scaling module 1408, deinterleaver 1410, Viterbi decoder 1412, and subsequently to 1414. Demodulator 1400 demodulates and equalizes burst data $D_B$ to generate equalized data $D_E$. Equalized data $D_E$ are soft-decision data comprising multi-bit to represent a single-bit (hard-decision data).

Data segmentation module 1402, quality measure module 1404, scaling controller 1406, and scaling module 1408 perform scaling and quantization on equalized data $D_E$. Data segmentation module 1402 divides equalized data $D_E$ into k parts (a plurality of subdata) to provide the $i^{th}$ part $D_i$, where k is a positive integer exceeding or equal to 2, and i is an integer variable ranging from 1 to k. Quality measure module 1404 calculates signal quality $Q_i$ of the data part $D_i$. Signal quality $Q_i$ may be a signal-to-interference-and-noise ratio (SINR), and where k=2 and equalized data $D_E$ is divided by two equal parts, the SINR for each part is represented as:

$$SINR = P_S/P_{I+N} = \frac{\frac{1}{156}\sum_{m=1}^{156}|r_m|^2}{\frac{1}{length/k}\sum_{m=1}^{length/k}|r_m - rb_m|^2} \quad [1]$$

Where $P_S$ is signal power,
$P_{I+N}$ is noise and interference power,
length is data length of equalized data $D_E$,
k is number of data segments,
$r_m$ is the $m^{th}$ equalized data $D_E$, and
$rb_m$ is the $m^{th}$ rebuilt equalized data $D_E$.

Scaling controller 1406 receives signal quality $Q_i$ to generate scale factor $S_i$. Scaling controller 1406 may determine similarity indicator S of all signal qualities $Q_i$, estimate average signal quality $Q_{avg}$ of all signal qualities $Q_i$ as scale factor $S_i$ if all signal qualities $Q_i$ are similar, and output signal quality $Q_i$ as scale factor $S_i$ if one of signal quality $Q_i$ is dissimilar. The similarity indicator S is measured by a statistical data of all signal qualities $Q_i$, and may be a standard deviation, variance, difference, slope, or a minimum or maximum data. Scaling controller 1406 compares the similarity indicator S with first threshold th1, determines all signal qualities $Q_i$ are similar if the statistical measure is less than first threshold th1, and determines one of signal quality $Q_i$ is dissimilar if the statistical measure exceeds first threshold th1.

Scaling controller 1406 may also determine interference in all data parts $D_i$ based on all signal qualities $Q_i$ to control scale factor $S_i$, estimate first average signal quality $Q_{avg1}$ based on signal quality $Q_i$ corresponding to the data part $D_i$ before the interference, and estimate second average signal quality $Q_{avg2}$ based on signal quality $Q_i$ corresponding to the data part $D_i$ after the interference. Scaling controller 1406 outputs first average signal quality $Q_{avg1}$ as scale factor $S_i$ for data part $D_i$ before the interference, and second average signal quality $Q_{avg2}$ as scale factor $S_i$ for data part $D_i$ after the interference. Scaling controller 1406 calculates a difference between any two adjacent signal qualities $Q_i$ and $Q_{i+1}$, identifies a maximum difference among all differences, determines no interference if the maximum difference is less than second threshold th2, and determines data part $D_i$ corresponding to the maximum difference as the interference, if the maximum difference exceeds second threshold $th_2$.

Scaling module 1408 determines scale factor $S_i$, scales and quantizes each data part $D_i$ according to scale factor $S_i$ to output $D_S$. When scaling controller 1406 estimates scale factor $S_i$ based on the similarity indicator S, scaling module 1408 scales data part $D_i$ with signal quality $Q_i$ if one of signal quality $Q_i$ is dissimilar, and scales data part $D_i$ with average signal quality $Q_{avg}$ if all signal qualities are similar. When scaling controller 1406 estimates scale factor $S_i$ based on the interference, scaling module 1408 scales data part $D_i$ before the interference with first average signal quality $Q_{avg1}$, and scales data part Di after the interference with second average signal quality $Q_{avg2}$. Scaling module 1408 scales data part $D_i$ by the relationship:

$$D_S = Quantize(D_E * S_i) \quad [2]$$

Where $D_S$ is a scaling output,
$D_E$ is an equalized soft-decision data, and
$S_i$ is a scaling factor.

Deinterleaver 1410 deinterleaves $D_S$ to provide deinterleaved $D_S$ to Viterbi decoder 1412 for convolutional decoding, the output thereof is passed to block decoder 1414 for error detection to generate output data $D_o$. Block decoder 1414 also provides indication on validity of decoded output data $D_o$.

Figure 2:
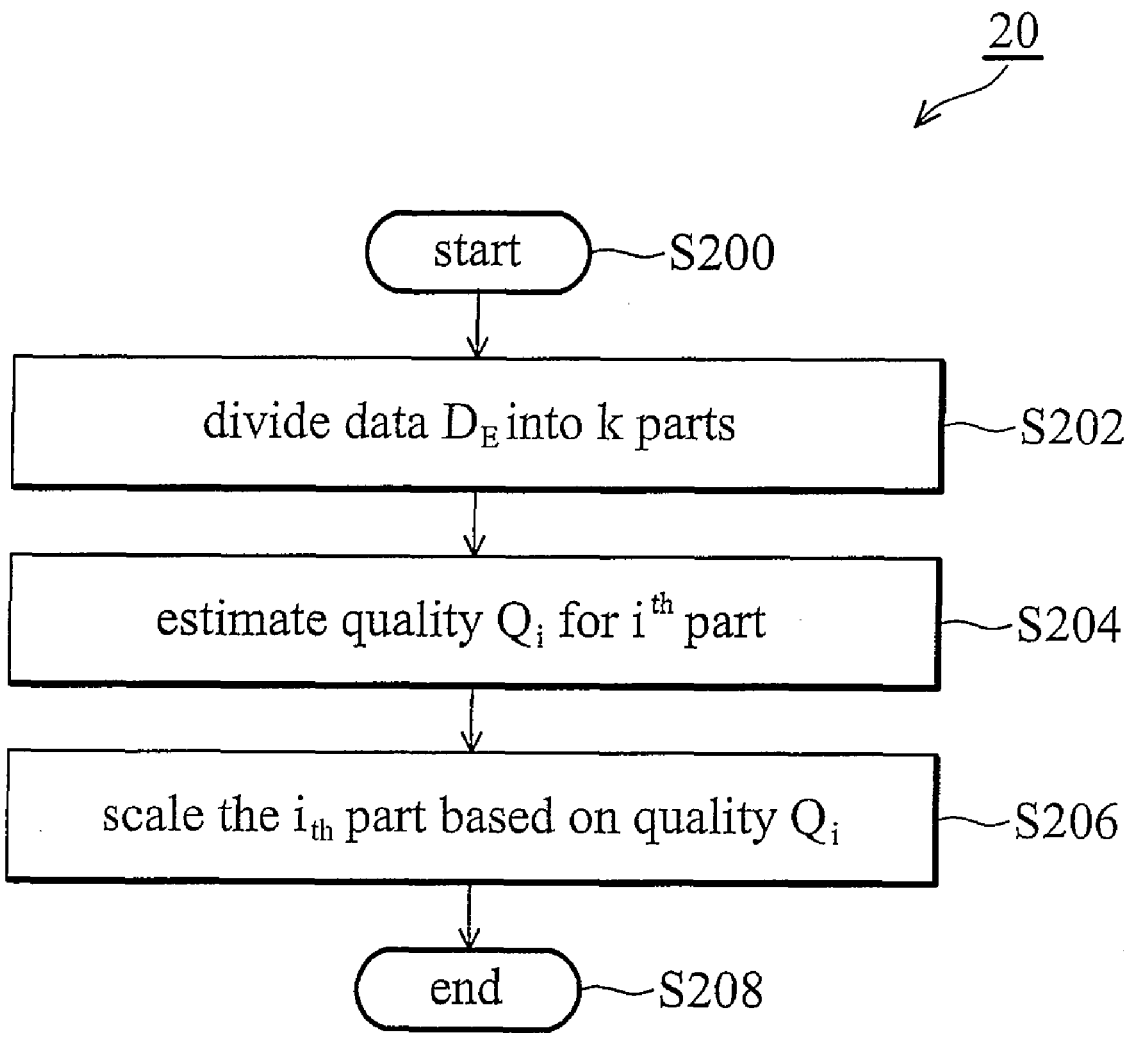
FIG. 2 is a flowchart of an exemplary method of scaling input data according to the invention, incorporating the communication system in FIG. 1.

FIG. 2 is a flowchart of an exemplary method of scaling input data according to the invention, incorporating the communication system in FIG. 1.

Scaling method 20 starts (S200) to divide equalized data $D_E$ into k data parts in data segmentation module 1402 (S202), estimate signal quality Qi for each data part $D_i$ in quality measure module 1404 (S204), and scale each data part $D_i$ based on signal quality Qi by scaling module 1408 (S206). Scaling method 20 undergoes Step S204 and S206 for each $i^{th}$ data part $D_i$ through the last data part Dk, then exits the process at Step S208. Each data part $D_i$ is scaled based on signal quality Qi, rather than an averaged signal quality of equalized data $D_E$ in the conventional method, such that each data scaling reflects channel conditions during the data transmission of data part $D_i$, providing increased accuracy.

Figure 3:
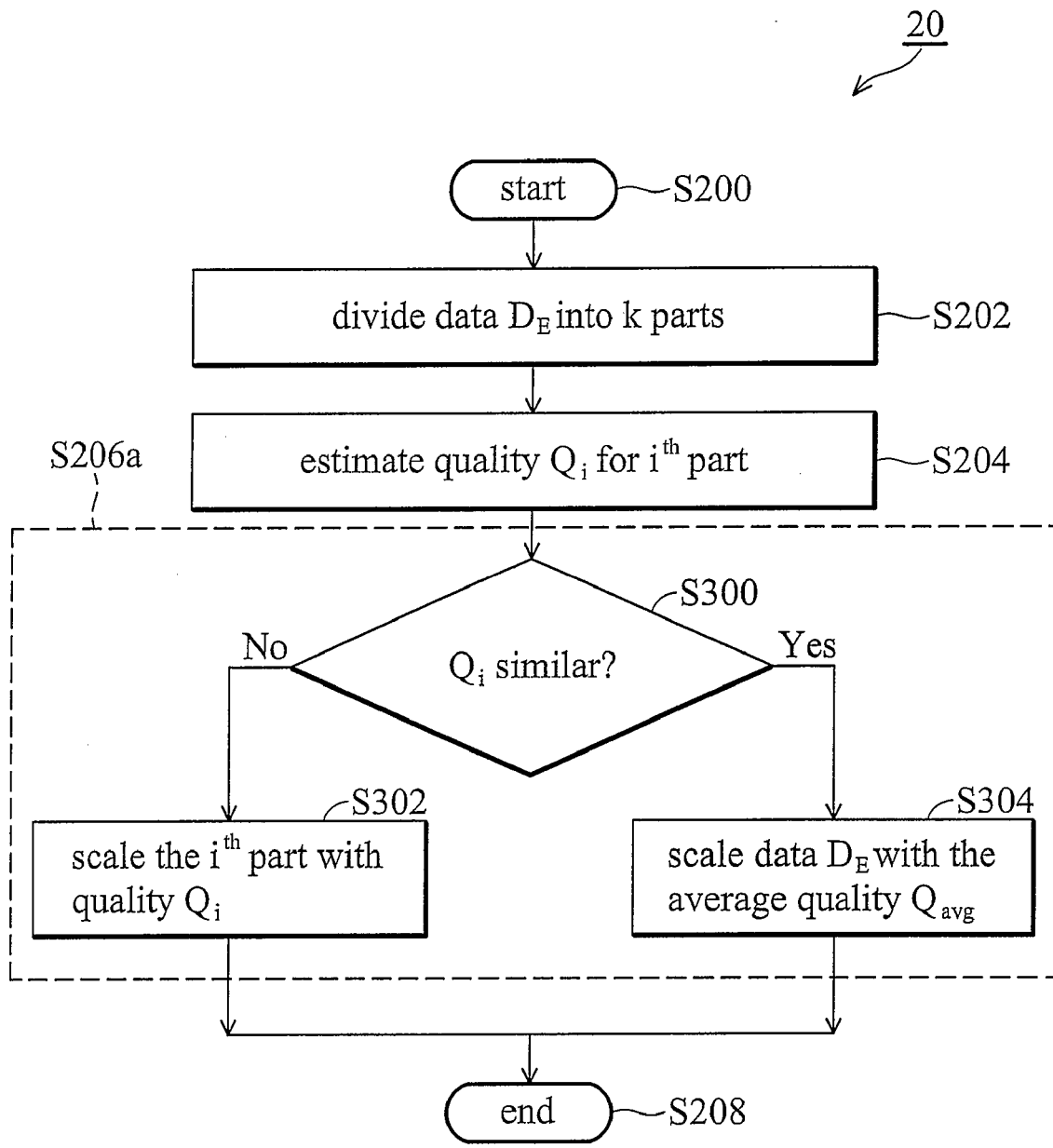
FIG. 3 is a flowchart of a detailed method of scaling input data according to FIG. 2, incorporating the communication system in FIG. 1.

FIG. 3 is a flowchart of a detailed method of scaling input data according to FIG. 2, incorporating the communication system in FIG. 1. Steps S200, S202, S204, and S208 are explained in FIG. 2. Step S206a details the data scaling step as follows.

In Step S300, scaling controller 1406 determines similarity indicator S of all signal qualities Qi, with i=1 through k. If at least one signal quality $Q_i$ is dissimilar to the rest, scaling method 20 moves to Step S302, otherwise goes to Step S304.

In Step S302, scaling module 1408 scales data part $D_i$ with signal quality $Q_i$. Since at least one signal quality $Q_i$ is dissimilar, each data part $D_i$ is scaled separately with scaling factor $S_i$ corresponding to dissimilar channel conditions, such as the SINR of data part $D_i$, thus providing accurate scaling result.

In Step S304, scaling module 1408 scales data part $D_i$ with average signal quality $Q_{avg}$. Since all signal qualities $Q_i$ are similar, the channel conditions are substantially constant, and a common scale factor can be used for all data $D_i$. Scaling controller 1406 estimates average signal quality $Q_{avg}$ of all signal qualities $Q_i$ to provide the common scale factor, so that signal quality under synchronous transmission scenario does not degrade.

Figure 4:
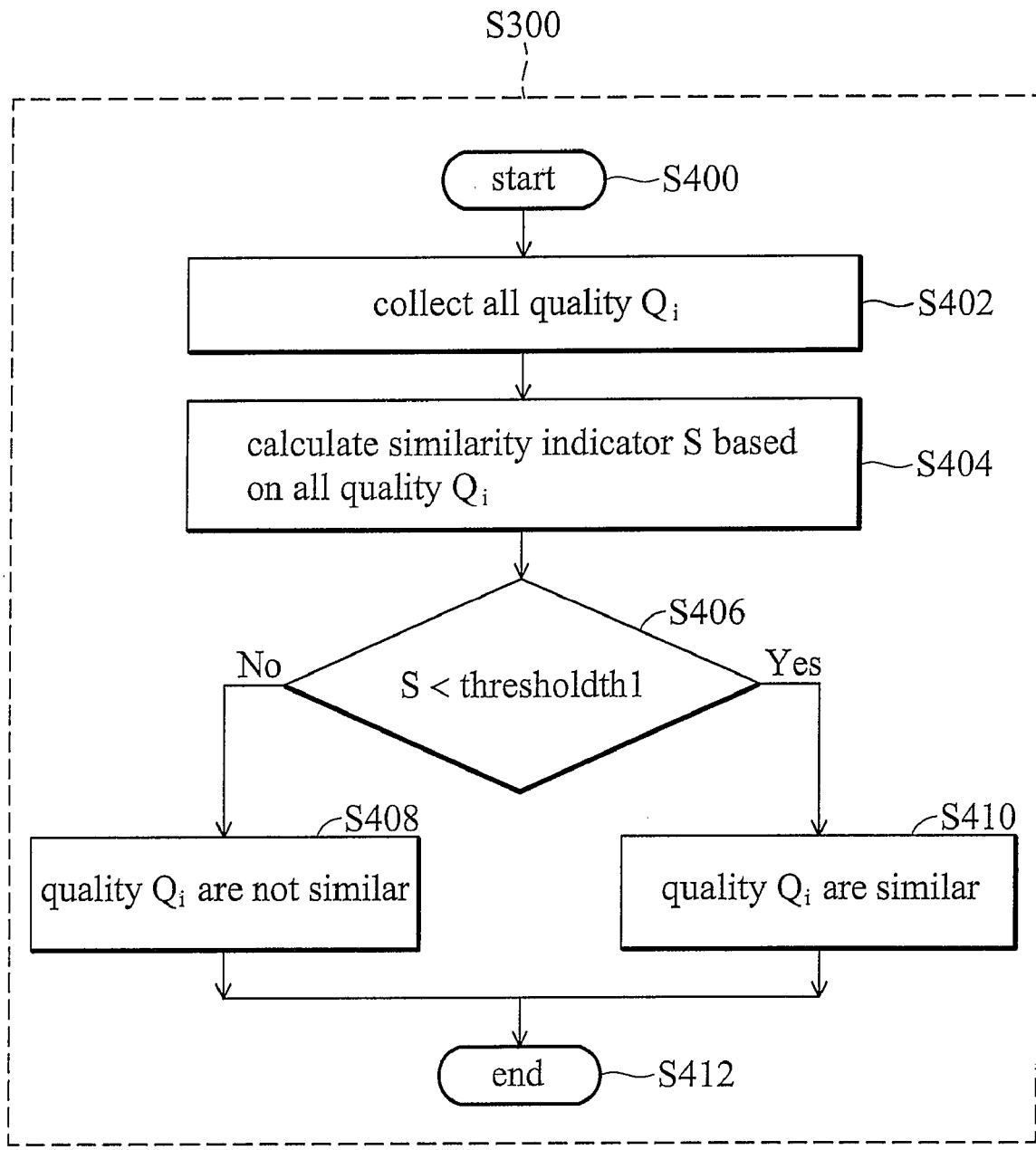
FIG. 4 is a flowchart of an exemplary method of determining similarity in FIG. 3.

FIG. 4 is a flowchart of an exemplary method of determining similarity indicator S in FIG. 3.

In Step 400, similarity determination method S300 starts. Next in Step S402, scaling controller 1406 collects all signal qualities $Q_i$ to calculate a statistical measure based thereon (S404). The statistical measure may be a standard deviation, variance, difference, slop, or a minimum or maximum data in all signal qualities $Q_i$. For example, scaling controller 1406 may compute standard deviation sd of all signal qualities $Q_i$.

In Step S406, scaling controller 1406 compares the statistical measure with predetermined threshold th1, continues Step S408 if the statistical measure exceeds or equals the first threshold th1, and Step S410 if the statistical measure is less than the first threshold th1. The value of first threshold th1 depends on choice of the statistical measure. If scaling controller 1406 computes standard deviation sd as the statistical measure, the first threshold th1 is chosen to provide a threshold for standard deviation.

Next in Step S408, scaling controller 1406 determines at least one signal quality $Q_i$ is dissimilar to the others, and in Step S410, scaling controller 1406 determines all signal qualities $Q_i$ are similar, both steps lead to Step S412, and similarity determination S300 stops.

Figure 5:
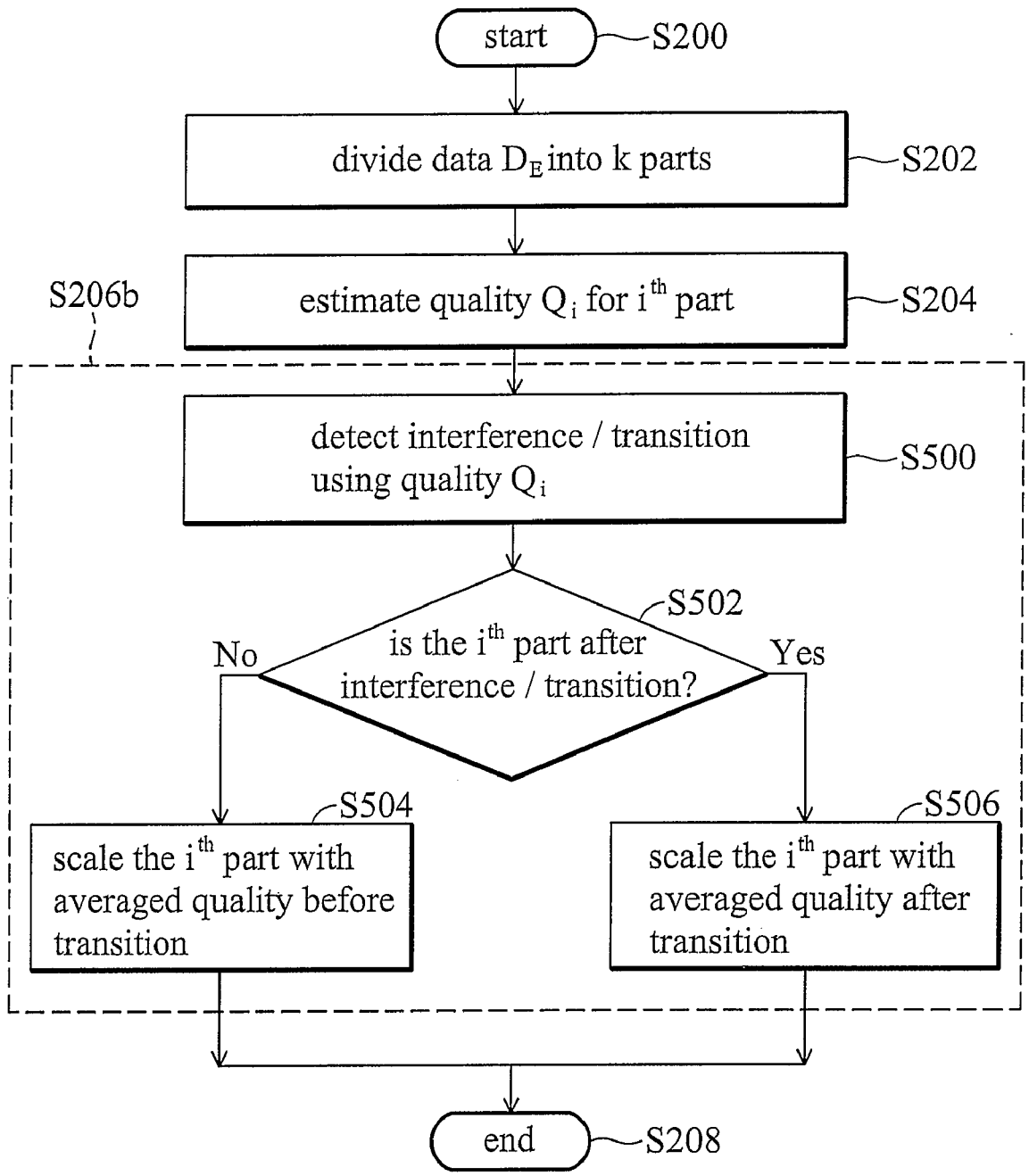
FIG. 5 is a flowchart of another detailed method of scaling input data according to FIG. 2, incorporating the communication system in FIG. 1.

FIG. 5 is a flowchart of another detailed method of scaling input data according to FIG. 2, incorporating the communication system in FIG. 1. Steps S200, S202, S204, and S208 are explained in FIG. 2. Step S206b details the data scaling step as follows.

In Step S500, scaling controller 1406 detects interference or transition using all signal qualities $Q_i$, continues Step S502 if an interference or transition is detected, otherwise method 20 stops. Interference or transition corresponds to an interfered data part in equalized data $D_E$.

In Step S502, scaling controller 1406 determines position of each data part $D_i$ with respect to the interference. If data part $D_i$ is before the interference, method 20 goes to Step S504, and Step S506 otherwise.

In Step S504, scaling controller 1406 estimates first average signal quality $Q_{avg1}$ based on signal quality $Q_i$ corresponding to the data parts before the interference, and scaling module 1408 scales the data parts before the interference with first average signal quality $Q_{avg1}$.

In Step S506, scaling controller 1406 estimates second average signal quality $Q_{avg2}$ based on signal quality $Q_i$ corresponding to the data parts after the interference, and scaling module 1408 scales the data parts after the interference with second average signal quality $Q_{avg2}$.

Figure 6:
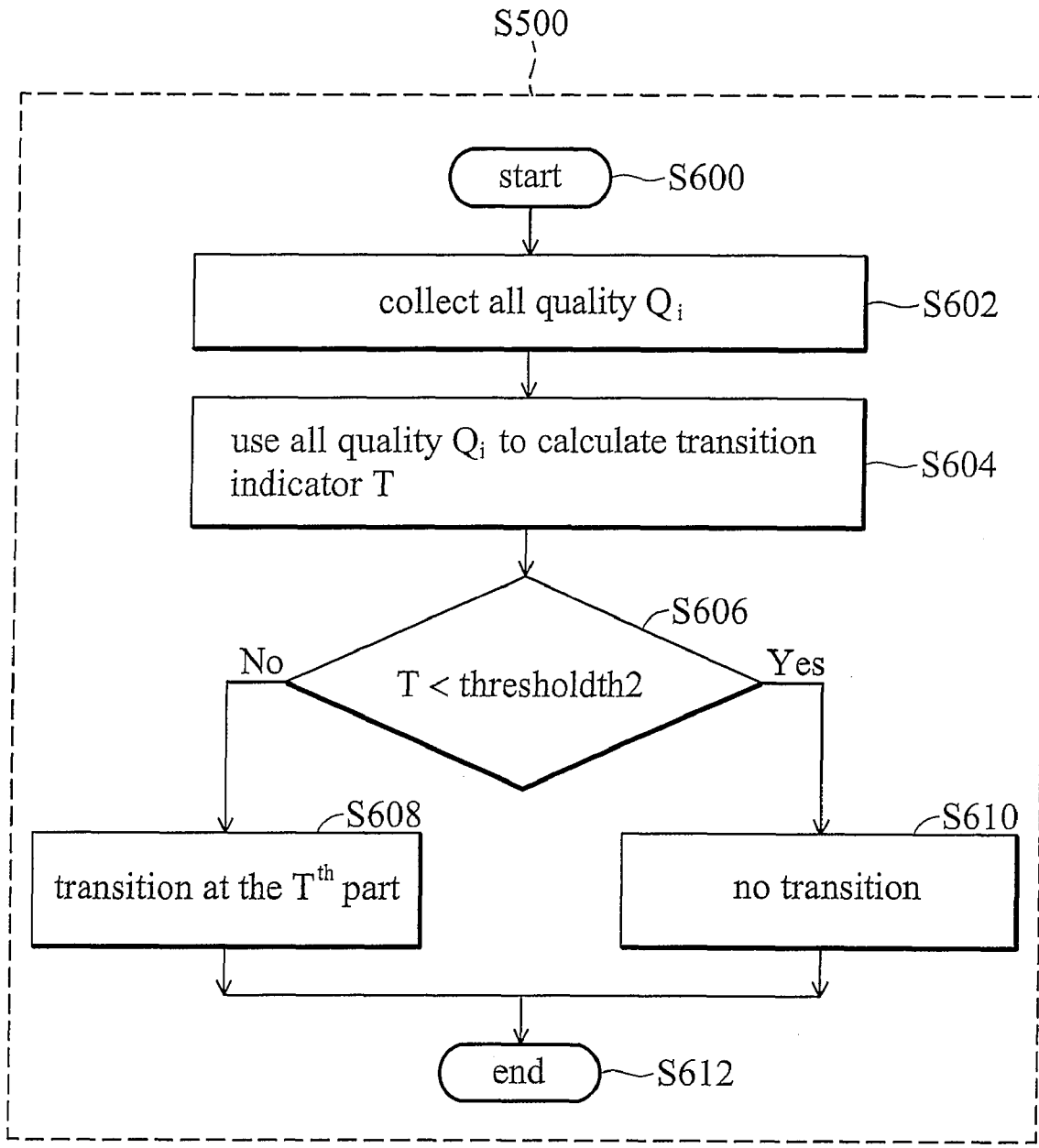
FIG. 6 is a flowchart of an exemplary method of determining interference in FIG. 5.

FIG. 6 is a flowchart of an exemplary method of determining interference in FIG. 5.

In Step S600, interference determination method S500 starts. Next in Step S602, scaling controller 1406 collects all signal qualities $Q_i$ to calculate difference Ti between any two adjacent signal qualities $Q_i$ and $Q_{i+1}$ (S604), and identify maximum difference $T_{max}$ among all differences.

Next in Step S606, scaling controller 1406 compares maximum difference $T_{max}$ with the second threshold th2, continues Step S608 if maximum difference $T_{max}$ exceeds or equals the second threshold th2, and Step S610 otherwise.

In Step S608, scaling controller 1406 determines interference at data parts corresponding to maximum difference $T_{max}$. Since each difference T corresponds to two data parts, scaling controller 1406 may select the later of the two for the position of the interference.

In Step S610, since maximum difference $T_{max}$ is within the second threshold th2, scaling controller 1406 determines no interference in equalized data $D_E$.

In Step S612, method S500 stops.

Figure 7:
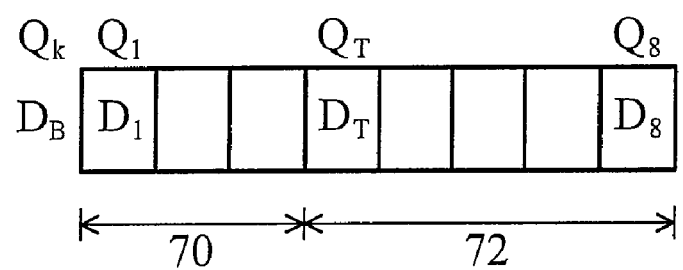
FIG. 7 shows the data parts and the corresponding signal quality incorporated in the method in FIG. 6.

FIG. 7 shows the data parts and the corresponding signal quality incorporated in the method in FIG. 6, comprising the data parts before the interference 70, and the data parts after the interference 72. Scaling controller 1406 detects the interference at data part $D_T$ since maximum difference $T_{max}$ occurs between data parts $D_3$ and $D_T$. First average signal quality $Q_{avg1}$ is generated based on signal qualities Q1, Q2, and Q3, and second average signal quality $Q_{avg2}$ is generated based on signal qualities QT through Q8. Thus data parts D1 though D3 are scaled by first average signal quality $Q_{avg1}$ and data parts DT though D8 are scaled by first average signal quality $Q_{avg2}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of processing downlink burst data in a receiver, comprising:
   demodulating and equalizing the downlink burst data to generate equalized data, wherein the equalized data are soft-decision data comprising multi-bit to represent a single-bit data;
   dividing the equalized data into a plurality of subdata;
   calculating a signal quality of each subdata;
   scaling each subdata according to corresponding signal quality; and
   quantizing the scaled subdata, thereby enabling the quantized subdata to be decoded, wherein scaling comprises:
   determining each subdata as one of a first type and a second type according to a characteristic of the signal qualities;
   scaling each subdata being the first type with the corresponding signal quality or a first average signal quality; and
   scaling each subdata being the second type with a second average signal quality.

2. The method of claim 1, wherein scaling comprises:
   determining a similarity of the signal qualities;
   scaling each subdata with the corresponding signal quality if one of the signal qualities is dissimilar;
   estimating the second average signal quality of the signal qualities;
   setting the signal quality of each subdata as the second average signal quality; and
   scaling the plurality of subdata with the second average signal quality if the signal qualities are similar.

3. The method of claim 2, wherein determination comprises:

calculating a statistical measure based on the signal qualities;

determining the signal qualities are similar if the statistical measure is less than a first threshold; and determining one of the signal qualities is dissimilar if the statistical measure exceeds the first threshold.

4. The method of claim 3, wherein the statistical measure is a standard deviation of the signal qualities.

5. The method of claim 1, wherein scaling comprises:

determining an interference in the plurality of subdata based on the signal qualities;

estimating the first average signal quality based on at least one signal quality corresponding to at least one subdata before the interference;

estimating the second average signal quality based on at least one signal quality corresponding to at least one subdata after the interference;

scaling the at least one subdata before the interference with the first average signal quality; and scaling the at least one subdata after the interference with the second average signal quality.

6. The method of claim 5, wherein determination comprises:

calculating a difference between any two signal qualities with adjacent subdata;

identifying a maximum difference among the differences; and determining the subdata corresponding to the maximum difference as the interference, if the maximum difference exceeds a second threshold.

7. The method of claim 1, wherein the signal quality is signal-to-interference-and-noise ratio.

8. A mobile device capable of processing downlink burst data, comprising:

a demodulator, demodulating and equalizing the downlink burst data to generate equalized data, wherein the equalized data are soft-decision data comprising multi-bit to represent a single-bit data;

a data segmentation module, dividing the equalized data into a plurality of subdata;

a quality measure module, coupled to the data segmentation module, calculating a signal quality of each subdata;

a scaling controller, coupled to the quality measure module, determining each subdata as one of a first type and a second type according to a characteristic of the signal qualities; and a scaling module, coupled to the scaling controller, scaling each subdata being the first type with the corresponding signal quality or a first average signal quality, scaling each subdata being the second type with a second average signal quality, and quantizing the scaled subdata, thereby enabling the quantized subdata to be decoded.

9. The mobile device of claim 8, wherein the scaling controller determines similarity of the signal qualities, the scaling module estimates the second average signal quality of the signal qualities as a scale factor if the signal qualities are similar, provides the corresponding signal quality as the scale factor if one of the signal qualities is dissimilar, and wherein the scaling module scales each subdata with the scale factor.

10. The mobile device of claim 9, wherein the scaling controller calculates a statistical measure based on the signal qualities, determines the signal qualities are similar if the statistical measure is less than a first threshold, and determines one of the signal qualities is dissimilar if the statistical measure exceeds the first threshold.

11. The mobile device of claim 10, wherein the statistical measure is a standard deviation of the signal qualities.

12. The mobile device of claim 8, wherein the scaling controller determines an interference in the plurality of subdata based on the signal qualities, the scaling module estimates the first average signal quality based on at least one signal quality corresponding to at least one subdata before the interference, and estimates the second average signal quality based on at least one signal quality corresponding to at least one subdata after the interference, and wherein the scaling module scales the at least one subdata before the interference with the first average signal quality, and scales the at least one subdata after the interference with the second average signal quality.

13. The mobile device of claim 12, wherein the scaling controller calculates a difference between any two signal qualities with adjacent subdata, identifies a maximum difference among the differences, and determines the subdata corresponding to the maximum difference as the interference, if the maximum difference exceeds a second threshold.

14. The mobile device of claim 8, wherein the signal quality is signal-to-interference-and-noise ratio.

15. A receiver capable of processing downlink burst data, comprising:

a demodulator, demodulating and equalizing the downlink burst data to generate equalized data, wherein the equalized data are soft-decision data comprising multi-bit to represent a single-bit data;

a data segmentation module, dividing the equalized data into a plurality of subdata;

a quality measure module, coupled to the data segmentation module, calculating a signal quality of each subdata;

a scaling controller, coupled to the quality measure module, determining each subdata as one of a first type and a second type according to a characteristic of the signal qualities; and a scaling module, coupled to the scaling controller, scaling each subdata being the first type with the corresponding signal quality or a first average signal quality, scaling each subdata being the second type with a second average signal quality, and quantizing the scaled subdata, thereby enabling the quantized subdata to be decoded.

16. The receiver of claim 15, wherein the scaling controller determines similarity of the signal qualities, the scaling module scales each subdata with the corresponding signal quality if one of the signal qualities is dissimilar, the scaling module estimates the second average signal quality of the signal qualities, sets the signal quality of each subdata as the second average signal quality, and scales the plurality of subdata with the second average signal quality if the signal qualities are similar.

17. The receiver of claim 16, wherein the scaling controller calculates a statistical measure based on the signal qualities, determines the signal qualities are similar if the statistical measure is less than a first threshold, and determines one of the signal qualities is dissimilar if the statistical measure exceeds the first threshold.

18. The receiver of claim 17, wherein the statistical measure is a standard deviation of the signal qualities.

19. The receiver of claim 15, wherein the scaling controller determines an interference in the plurality of subdata based on the signal qualities, and wherein the scaling module estimates the first average signal quality based on at least one signal quality corresponding to at least one subdata before the interference, the second average signal quality based on at least one signal quality corresponding to at least one subdata after the interference, scales the at least one subdata before the interference with the first average signal quality, and scales the at least one subdata after the interference with the second average signal quality.

20. The receiver of claim 19, wherein the scaling controller calculates a difference between any two signal qualities with adjacent subdata, identifies a maximum difference among the differences, and determines the subdata corresponding to the maximum difference as the interference, if the maximum difference exceeds a second threshold.

21. The receiver of claim 15, wherein the signal quality is signal-to-interference-and-noise ratio.

* * * * *